United States Patent [19]

Tromborg et al.

[11] Patent Number: 4,801,799
[45] Date of Patent: Jan. 31, 1989

[54] FIBER OPTIC SYSTEM FOR DETECTING VIBRATIONS OF A REFLECTING SURFACE

[75] Inventors: Erik T. Tromborg, Bloomington; James H. Garfunkel, Golden Valley, both of Minn.

[73] Assignee: Honeywell Inc., Minneapolis, Minn.

[21] Appl. No.: 126,071

[22] Filed: Nov. 27, 1987

[51] Int. Cl.[4] .............................................. H01J 5/16
[52] U.S. Cl. ................................ 250/227; 250/231 R; 73/655
[58] Field of Search ............ 250/227, 231 R; 73/655, 73/656, 657

[56] References Cited

U.S. PATENT DOCUMENTS 4,719,341 1/1988 Hoogenboom ...................... 250/227
4,737,624 4/1988 Schwarte ............................ 250/227
4,739,161 4/1988 Moriyama et al. ................. 250/227

Primary Examiner—David C. Nelms
Attorney, Agent, or Firm—C. G. Mersereau; W. B. Easton

[57] ABSTRACT

A fiber optic vibration sensor for detecting vibrations of a reflecting surface located externally of the sensor is disclosed which includes a transparent body, source and return optic fibers fastened to the body, a light collimating lens which forms light emanating from the source fiber into a column which extends in a predetermined viewing direction relative to the body. The sensor is positioned relative to the reflecting surface so that the column strikes the reflecting surface and is reflected back through the lens to a focal point in the vicinity of the end of the return optic fiber.

5 Claims, 2 Drawing Sheets

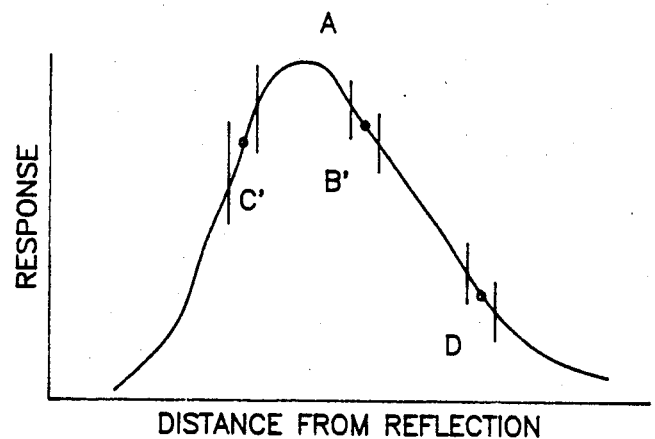
Fig. 4
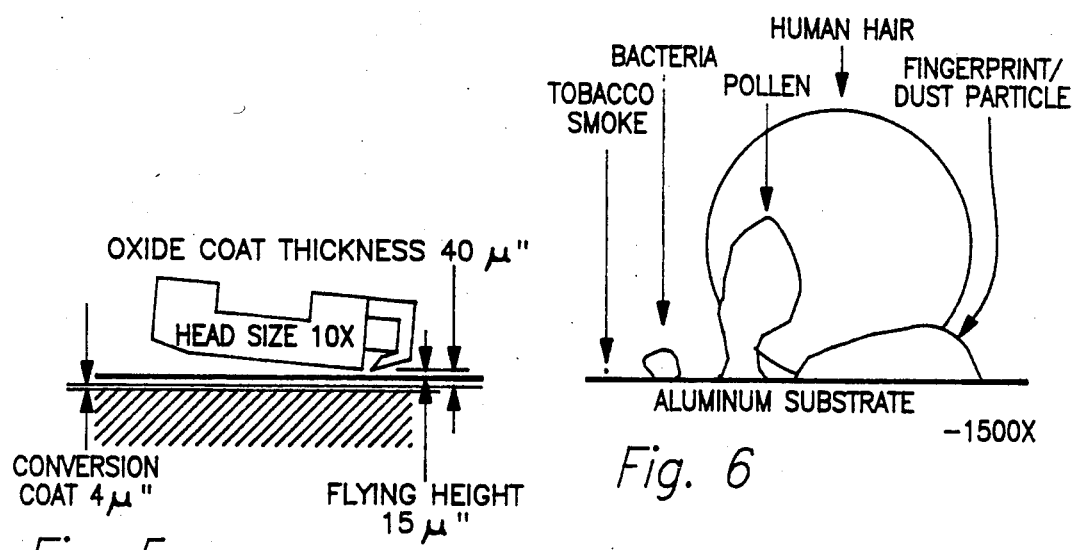
Fig. 5
Fig. 6
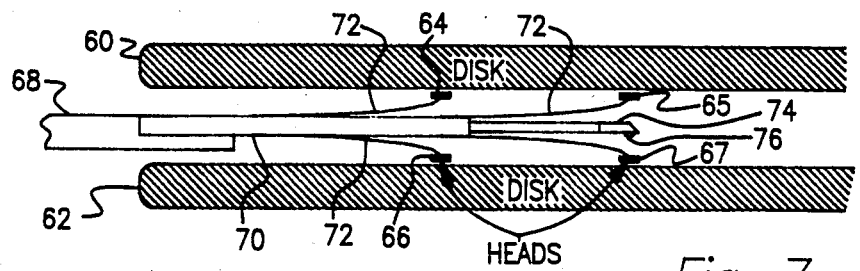
Fig. 7
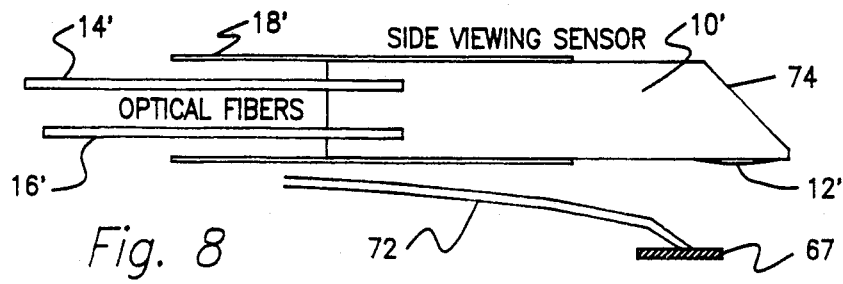
Fig. 8

FIBER OPTIC SYSTEM FOR DETECTING VIBRATIONS OF A REFLECTING SURFACE

The invention relates to the frequency detection of a vibrating surface by a fiber optic vibration sensor.

The sensor herein which functions as a displacement frequency detector is an improvement over the sensor of U.S. Pat. No. 4,487,206 which is a pressure detector. To the extent that the invention herein utilizes conventional fiber optic techniques and technology disclosed in said patent, such techniques and technology are made a part hereof by way of reference.

A main object of the invention is to provide a new and improved fiber optic type displacement frequency sensor device.

Other objects and advantages of the invention will become apparent from the following specification, appended claims and attached drawings.

In the drawings:

FIG. 4 illustrates graphically a typical response characteristic of the frequency sensor device hereof;

FIGS. 5 and 6 which have the same scale illustrate the relative dimensions of a computer disk drive compared to common contaminants to indicate that even very small vibrations of a disk can cause difficulties;

FIG. 7 is a sectional view showing the installation of the frequency sensor device hereof installed between two disks of a computer disk drive for measuring the vibrations of one of the heads of the disk which is an indication of the vibration of the associated disk or vibration of the head caused by subject anomalies on the disk; and FIG. 8 is an enlarged view of a portion of the assembly of FIG. 7.

Figure 1:
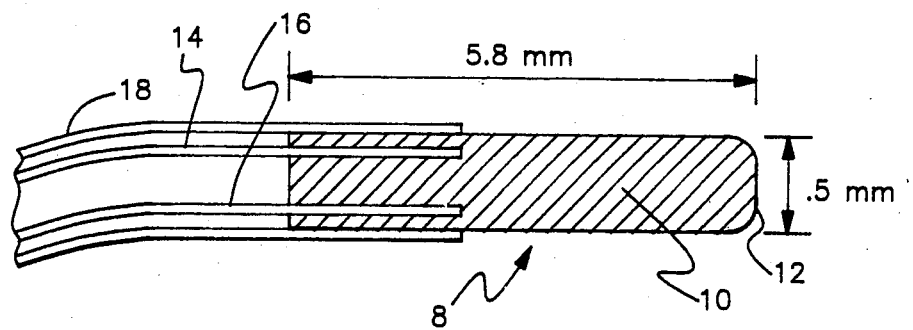
FIG. 1 is a sectional view of an embodiment of the fiber optic frequency sensor device of the invention herein.

An embodiment of the fiber optic frequency sensor device of the present invention shown in FIG. 1 is an assembly 8 which includes a molded elongated cylindrically shaped body section 10 having an optical lens 12 formed at one end thereof. Body section 10 and lens 12 thereof are transparent to visible light and may be made of a plastic such as lucite. Lens 12 has a convex curved surface.

Two optic fibers 14 and 16 are fastened to the rear or other end of the body section 10 and a surrounding flexible tube 18 in which the optic fibers are disposed is connected to the rear end of the outer periphery of the body section 10. Typically the optic fibers may be 250 micrometer plastic fibers.

Figure 2:
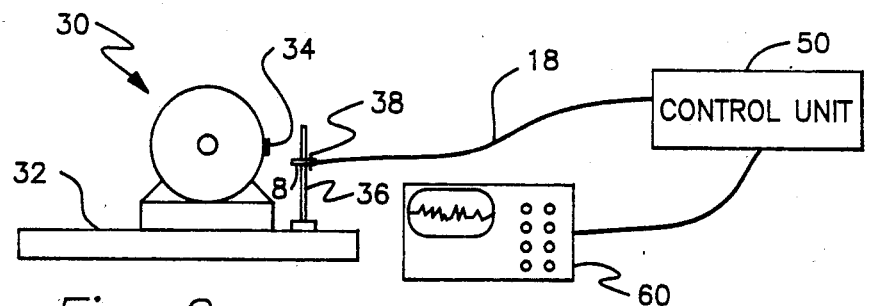
FIG. 2 shows an application in which the frequency sensor device of FIG. 1 is utilized to detect and measure the vibrational frequency of an electric motor.

An application of the frequency sensor device is shown in FIG. 2 in which the device is utilized to detect and measure the vibrational frequency of an electric motor 30 mounted on a support platform or bed 32.

The motor housing is fitted with a small mirror 34 or the like to provide a reflecting surface. Mounting apparatus 36 is provided for holding the sensor device 8 in a horizontal position with the lens 12 thereof in juxtaposition to the mirror 34. A micrometer type device 38 is provided to adjustably move the sensor device 8 towards and away from the mirror 34 to facilitate positioning the device lens 12 relative to the mirror 34.

A control unit 50 is provided to which the optic fibers 14 and 16 and the surrounding tube 18 are operatively connected. Control unit 50 functions or operates in a conventional manner to provide a light source for one of the optic fibers 14 and means for detecting the intensity of reflected light emitted from the other optic fiber 16.

The light directed into the source fiber 14 via the control unit 50 emanates as a cone of light from the other end of the fiber as it enters the body section 10. Lens 12 functions to collimate the light and direct it forwardly towards the mirror 34 on the motor 30.

Figure 3:
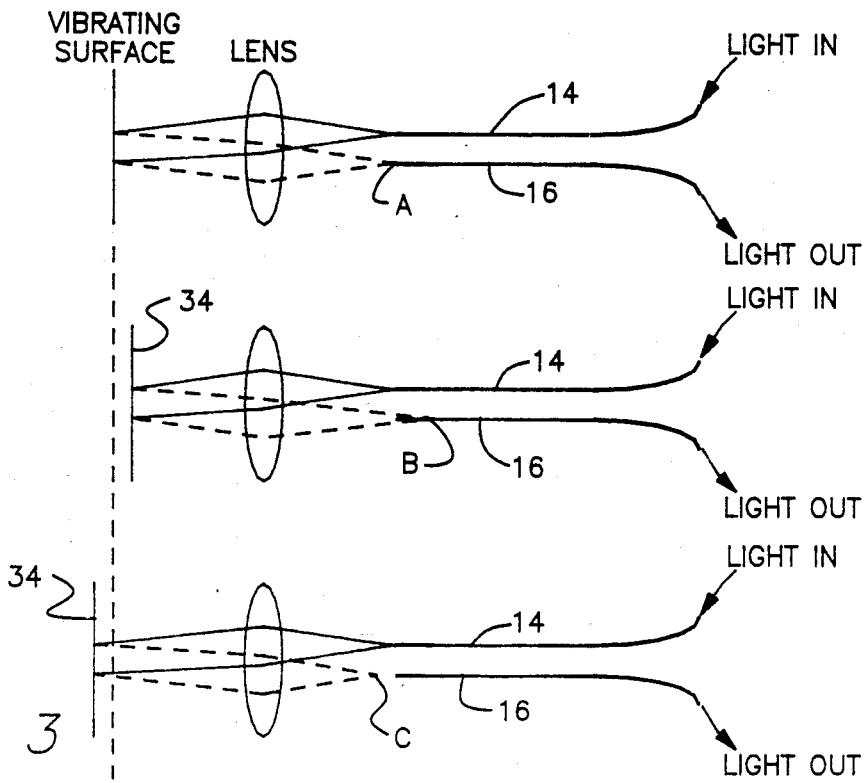
FIG. 3 illustrates with three different focal points A, B and C the principle of operation of the frequency sensor device hereof.

In the operation of the device, the principle of which is illustrated in FIG. 3, light or invisible emissions are directed from the emitting or source fiber 14 through the lens 12 to the reflecting surface of the mirror 34 and back through the lens 12 to the receiving or return fiber 16. This arrangement, which consists in effect of two lenses and a mirror, magnifies any displacement of the reflecting surface of the mirror 34 relative to the lens 12. When the system is in perfect focus, which is facilitated by the movement of the device 8 relative to the mirror 34 by the micrometer 38, a maximum intensity output is detected at the end of the return fiber 16 in the control unit 50. This output will be reduced by any movement or deflection of the reflecting surface of mirror 34 either towards or away from the lens 22.

In FIG. 3 the perfect focus condition is indicated in the upper diagram thereof at point A where the focal point of the reflected light (dotted line) is exactly at the inlet of the return fiber 16. In the middle diagram of FIG. 3 the point B indicates an out-of-focus condition where the focal point is beyond the inlet of the return fiber 16. In the lower diagram of FIG. 3 the point C indicates the other or opposite out-of-focus condition where the focal point would be in front of the inlet of the return fiber 16.

Sensing and response means (not shown) are included in the control unit 50 which detect the intensity of the reflected light from the return fiber 16 and converts such data to a corresponding electrical quantity which can be read by a meter or an oscilloscope. A typical response characteristic for the device 8 is a curve illustrated in FIG. 4 which indicates the response or intensity of the light detected at the output end of the return fiber 16 relative to the distance of the focal point (A, B, or C in FIG. 3) from the surface of the mirror 34. When the reflecting surface 34 is in a position relative to lens 12 which corresponds to the best focal point A, the amount of energy reflected and focused on the receiving or return fiber 16 corresponds to the highest part of the curve indicated at A'. Correspondingly an amplified output of a photoelectric detector in the control unit 50 which is not shown would likewise be at a maximum.

When the reflecting surface 34 is at a position either closer to or further away from the lens 12, corresponding to the focal points B or C, the energy detected through the return fiber 16 is less than the maximum as indicated by the slopes of the curve on both sides of the point A' thereof. Sensitivity is greatest where the slope is steepest and optimally useful parts of the curve are the indicated segments having the center points B', C' and D, for example.

In operation, any part of the roughly linear portions of the curve of FIG. 4 represented by the slopes on opposite sides of the point A' are acceptable for vibratory measurements. Initially, when the motor 30 is not operating, the sensor is adjusted with the micrometer 38 to obtain a quiescent point on the curve of FIG. 4 at one of the points B', C' or D, for example. When the motor is started, and assuming that point B' is selected, the vibrations of the mirror 34 will cause the response to vary between the displacement limits of the indicated segment which brackets point B'.

A similar situation would of course prevail if the points C' or D or some other point on the linear parts of the curve were selected.

An oscilloscope 60 connected to the control unit 50 may be utilized to indicate the magnitude and frequency of the vibrations of the vibratory surface 34 being monitored by the sensor device 8. The oscilloscope would respond to an oscillating signal from the control unit 50 which would be representative of the amplitude and frequency of the vibrations of the mirror 34 on the motor 30.

Another application of the device involves the use thereof to detect vibrations in the disk drives of large computers. In a properly functioning disk drive system the heads fly aerodynamically at only 15 to 25 microinches above the disk surface. Any head or disk anomalies can thus tend to set up excessive vibrations in the heads or the head suspension geometry which can be the cause of head or disk crashes. Such crashes are defined as damage to or destruction of magnetic storage media on the disk.

The magnitude of the problem relative to disk drives is illustrated in FIGS. 5 and 6 in which the height of the head above the disk drive shown in FIG. 5 is compared to the dimensions of common contaminants shown in FIG. 6. These comparisons clearly indicate that even very small perturbations of the disk surface can create difficulties and are a cause for concern.

An example of the sensor device installed in a disk drive between two disks 60 and 62 is shown in FIG. 7 in which the disks are spaced apart on the order of 0.3". Disk heads 64, 65, 66 and 67 are supported on a spring suspension system having an arm 70, which extends between the disks, to which the heads are connected by delicate leaf springs 72 in a conventional manner. A sensor 74 similar to the sensor 8 is fastened to the arm 70 and extends therefrom so that the outward end thereof is in close proximity to the head 67.

The sensor device 8 of FIGS. 1 to 3 is of a forward viewing design because the surface 34 for which vibrations are to be detected is forward of the sensor. In the configuration of FIG. 7 the head 67 is located at the side of the end of sensor 74. Sensor 74 is accordingly provided with a side-viewing configuration of the optical assembly in which the lens 12' thereof faces laterally or sideways towards the head 67, and the light to and from the optical fibers is directed to the lens by the angled reflecting surface at the end of the sensor 74. Such reflecting surface may optimally be on head 67 or the outer, adjacent end of the leaf spring 72.

An enlarged view of the side-viewing sensor device 74 is shown in FIG. 8. Parts of the sensor device 74 which correspond to or are the same as parts of the sensor device 8 are designated with primed reference numerals.

While only one sensor 74 for monitoring head 67 is illustrated, it is within the scope of the invention that other sensors may be provided to monitor the vibration movements of the other heads 64, 65 and 66. It is anticipated that one or more sensor assemblies, including the sensor 74 and other sensors, be integral and permanent parts of the disk drive unit and thus provide a continuous monitoring of the movements of one or more of the heads so that excessive head and disk vibrations can be detected prior to crashing of the disk drive system.

Qualitative tests of the sensor device herein revealed high sensitivity to very small disturbances. In one such test involving the embodiment of FIGS. 7 and 8, the effects of a paper clip dropped on the structure 68 supporting the arm 70 were detected and found to be approximately 200 Hz. Actually two disturbances were detected with the latter disturbance being attributable to the bouncing of the paper clip.

It is claimed:

1. A fiber optic system for detecting vibrations of a reflecting surface, comprising, a transparent body, source and return optic fibers having distal ends fastened to the proximal end of said body, light collimating lens means at the distal end of said body facing in a predetermined viewing direction relative to said body, said lens means being operable to shape light emanating from said source fiber into a column which extends in said predetermined viewing direction to said body, mounting means for positioning said lens means relative to said reflecting surface so that when said reflection surface is quiescent said column strikes said reflecting surface and is reflected back through said lens to a predetermined focal point in the vicinity of said distal end of said return optic fiber, and detecting means connected to the proximal end of said return optic fiber for detecting vibrations of said reflecting surface by detecting variations in the intensity of light emitted from said proximal end of said return optic fiber.

2. A fiber optic system according to claim 1 wherein said predetermined viewing direction is parallel to the axis of said body.

3. A fiber optic system according to claim 1 wherein said predetermined viewing direction is at an angle to the axis of said body.

4. A fiber optic system according to claim 1 wherein said mounting means is adjustable.

5. A fiber optic system according to claim 1 wherein said response signals have linear sections on opposite sides of said focal point and said predetermined point is in one of said sections.

* * * * *